United States Patent
Seki et al.

(10) Patent No.: US 10,629,077 B2
(45) Date of Patent: Apr. 21, 2020

(54) VEHICLE EXTERIOR INFORMATION SHARING SYSTEM, VEHICLE EXTERIOR INFORMATION SHARING APPARATUS AND VEHICLE EXTERIOR INFORMATION SHARING METHOD

(71) Applicant: TOYOTA JIDOSHA KABUSHIKI KAISHA, Toyota-shi, Aichi-ken (JP)

(72) Inventors: Yushi Seki, Ashigarakami-gun (JP); Ryoko Hashimoto, Fuji (JP); Katsuya Terahata, Susono (JP); Daiki Yokoyama, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/367,818

(22) Filed: Mar. 28, 2019

(65) Prior Publication Data

US 2019/0355254 A1  Nov. 21, 2019

(30) Foreign Application Priority Data

May 16, 2018 (JP) .................. 2018-094831

(51) Int. Cl.
```
G08G 1/14    (2006.01)
G07C 5/00    (2006.01)
H04W 4/46    (2018.01)
G06K 9/00    (2006.01)
```
(52) U.S. Cl.
CPC ......... *G08G 1/143* (2013.01); *G06K 9/00825* (2013.01); *G07C 5/008* (2013.01); *H04W 4/46* (2018.02)

(58) Field of Classification Search
CPC ..... G08G 1/143; H04W 4/46; G06K 9/00825; G07C 5/008
USPC ....................................... 340/932.2
See application file for complete search history.

(56) References Cited

U.S. PATENT DOCUMENTS

| | | | |
|---|---|---|---|
| 2009/0091477 A1* | 4/2009 | McCall ................. | G01S 19/42 340/990 |
| 2011/0320256 A1* | 12/2011 | Florucci ............ | G06Q 20/0453 705/14.33 |
| 2013/0293394 A1* | 11/2013 | Rubin .................... | H04W 4/06 340/902 |
| 2015/0039211 A1* | 2/2015 | Stefan ................... | G08G 1/148 701/117 |
| 2015/0124096 A1* | 5/2015 | Koravadi ........... | G06K 9/00825 348/148 |
| 2015/0130641 A1* | 5/2015 | Rahman ................ | G08G 1/142 340/932.2 |
| 2017/0025008 A1* | 1/2017 | Gignac ................. | G08G 1/143 |

(Continued)

FOREIGN PATENT DOCUMENTS

JP  2009-537367 A  10/2009

*Primary Examiner* — Ojiako K Nwugo
(74) *Attorney, Agent, or Firm* — Oliff PLC (57) ABSTRACT

A first terminal in a first vehicle included in a vehicle exterior information sharing system sends, when it is detected that a second vehicle is going to park around the first vehicle while the first vehicle is parked, vehicle exterior information on an object around the first vehicle, which is acquired by a sensor device installed on the first vehicle, and a second terminal in the second vehicle receives the vehicle exterior information sent by the first terminal and presents the received vehicle exterior information to a driver of the second vehicle.

9 Claims, 7 Drawing Sheets (56) References Cited

U.S. PATENT DOCUMENTS

| | | | |
|---|---|---|---|
| 2017/0045369 A1* | 2/2017 | Kim | G01C 21/3685 |
| 2017/0088052 A1* | 3/2017 | Nallapa | G01S 17/04 |
| 2017/0166115 A1* | 6/2017 | Pal | G08G 1/149 |
| 2017/0174261 A1* | 6/2017 | Micks | B62D 15/029 |
| 2018/0052860 A1* | 2/2018 | Hayes | H04W 4/029 |
| 2018/0053237 A1* | 2/2018 | Hayes | G08G 1/143 |
| 2018/0065625 A1* | 3/2018 | Tijerina | B60W 40/08 |
| 2018/0089631 A1* | 3/2018 | Baker, Sr. | H04L 67/02 |
| 2018/0118100 A1* | 5/2018 | Kjaer-Lohse | B60Q 1/346 |
| 2019/0082377 A1* | 3/2019 | Silver | B60W 50/14 |
| 2019/0197898 A1* | 6/2019 | Espinosa Cardenas | G08G 1/143 |

\* cited by examiner

VEHICLE EXTERIOR INFORMATION SHARING SYSTEM, VEHICLE EXTERIOR INFORMATION SHARING APPARATUS AND VEHICLE EXTERIOR INFORMATION SHARING METHOD

FIELD

The present invention relates to a vehicle exterior information sharing system, a vehicle exterior information sharing apparatus, and a vehicle exterior information sharing method for sharing information between vehicles.

BACKGROUND

To avoid collision between vehicles, there has been proposed a technique in which information is received from an adjacent vehicle, data related to an own vehicle is sent to the adjacent vehicle, prediction of movement trajectories of the vehicle and the adjacent vehicle as well as collection of information on a situation surrounding the vehicle is performed on the basis of the received information, the data related to the vehicle, the current own position and the current position of the adjacent vehicle, and data indicating dangerous situations, and in danger of a collision, a signal is transmitted to a driver and the adjacent vehicle (for example, see Published Japanese Translation of PCT International Publication for Patent Application (Kohyo) No. 2009-537367).

SUMMARY

In the aforementioned technique, data transmitted between the vehicles include GPS data, vehicle parameters such as a vehicle shape and a vehicle type, known information on vehicle dynamic characteristics, information indicating vehicle behaviors such as a current steering angle or current vehicle speed, information on a currently active vehicle safety system, and information on a driver assistance system.

When a driver is going to park a vehicle, to avoid collision of the vehicle against an object around the vehicle, it is preferable that the driver can utilize information on an object around the vehicle, for example, information indicating a distance from the vehicle to the object around the vehicle. However, some vehicles are not equipped with a sensor for detecting an object around the vehicles; therefore, a driver may not utilize information on an object around the vehicle.

It is an objective of the present invention to provide a vehicle exterior information sharing system capable of providing a vehicle that is going to park with information on an object around other vehicles positioned around the vehicle.

As one aspect of the present invention, a vehicle exterior information sharing system including a first terminal in a first vehicle and a second terminal in a second vehicle is provided. In the vehicle exterior information sharing system, when it is detected that the second vehicle is going to park around the first vehicle while the first vehicle is parked, the first terminal sends vehicle exterior information on an object around the first vehicle, which is acquired by a sensor device installed on the first vehicle; the second terminal receives the vehicle exterior information sent by the first terminal and presents the received vehicle exterior information to a driver of the second vehicle.

The vehicle exterior information sharing system preferably further includes a vehicle exterior information sharing apparatus that receives the vehicle exterior information sent by the first terminal and transfers the information to the second terminal.

In this case, the vehicle exterior information sharing apparatus preferably includes: a communication circuit capable of communicating with the first terminal and the second terminal; a memory that stores a number of the sensor devices that are installed on the first vehicle and that may be used for acquiring vehicle exterior information on an object around the first vehicle and a number of sensor devices that are installed on the second vehicle and that may be used for acquiring vehicle exterior information on an object around the second vehicle; and a processor configured to transfer the received vehicle exterior information to the second terminal via the communication circuit only when the number of the sensor devices installed on the first vehicle is more than the number of the sensor devices installed on the second vehicle.

In the vehicle exterior information sharing system, it is also preferable that the first terminal and the second terminal can communicate with each other and that, when communication is established between the first terminal and the second terminal while the first vehicle is parked, the first terminal detects that the second vehicle is going to park around the first vehicle.

As another aspect of the present invention, a vehicle exterior information sharing apparatus is provided. The vehicle exterior information sharing apparatus includes: a communication circuit capable of communicating with a first terminal in a first vehicle and a second terminal in a second vehicle; and a processor configured to receive, when it is detected that the second vehicle is going to park around the first vehicle while the first vehicle is parked, vehicle exterior information on an object around the first vehicle, which is acquired by a sensor device installed on the first vehicle from the first terminal via the communication circuit and transfer the received vehicle exterior information to the second terminal via the communication circuit.

The vehicle exterior information sharing apparatus preferably includes a memory that stores a number of the sensor devices that are installed on the first vehicle and that may be used for acquiring vehicle exterior information on an object around the first vehicle and a number of sensor devices that are installed on the second vehicle and that may be used for acquiring vehicle exterior information on an object around the second vehicle, and the processor preferably transfers the received vehicle exterior information to the second terminal via the communication circuit only when the number of the sensor devices installed on the first vehicle is more than the number of the sensor devices installed on the second vehicle.

As still another aspect of the present invention, a vehicle exterior information sharing method in a vehicle exterior information sharing system including a first terminal in a first vehicle and a second terminal in a second vehicle is provided. The vehicle exterior information sharing method includes: sending by the first terminal, when it is detected that the second vehicle is going to park around the first vehicle while the first vehicle is parked, vehicle exterior information on an object around the first vehicle, which is acquired by a sensor device installed on the first vehicle; receiving, by the second terminal, the vehicle exterior information sent by the first terminal and presenting, by the second terminal, the received vehicle exterior information to a driver of the second vehicle.

The vehicle exterior information sharing system according to the present invention provides an advantageous effect that a vehicle that is going to park may be provided with information on an object around another vehicle positioned around the vehicle.

DESCRIPTION OF EMBODIMENTS

With reference to figures, a vehicle exterior information sharing system, a vehicle exterior information sharing apparatus, and a vehicle exterior information sharing process executed by the vehicle exterior information sharing system will be described below. The vehicle exterior information sharing system transmits information on an object around a vehicle that is already parked (the vehicle may be referred to as a parked vehicle hereinafter for the sake of convenience), which is positioned around a vehicle that is going to park (the vehicle may be referred to as a moving vehicle hereinafter for the sake of convenience), which information is acquired by the parked vehicle (the information may be referred to as vehicle exterior information hereinafter for the sake of convenience) to the moving vehicle, and enables a driver of the moving vehicle to utilize the vehicle exterior information.

Figure 1:
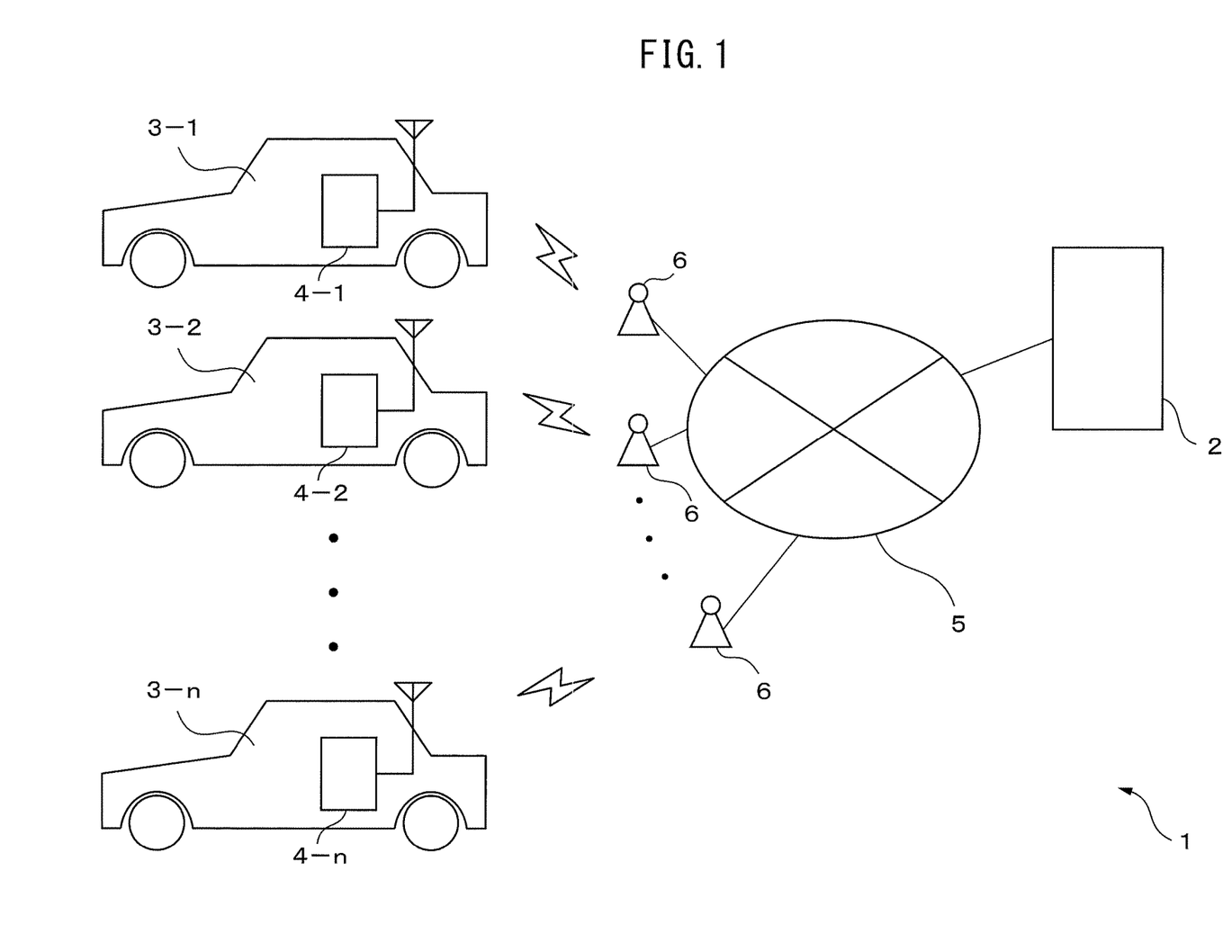
FIG. 1 is a schematic configuration diagram of a vehicle exterior information sharing system according to one example embodiment.

FIG. 1 is a schematic configuration diagram of the vehicle exterior information sharing system according to one example embodiment. The vehicle exterior information sharing system 1 includes a server 2, which is an example of the vehicle exterior information sharing apparatus, and a plurality of vehicles 3-1 to 3-$n$ ($n$ is an integer of two or greater). The vehicles 3-1 to 3-$n$ are respectively equipped with terminals 4-1 to 4-$n$, and the server 2 and the terminals 4-1 to 4-$n$ are configured to be capable of communicating with each other via a communication network 5, for example, constructed by optical communication lines.

The server 2 is connected to the communication network 5, for example, via a gateway (not illustrated). The server 2 mediates transmission, from a parked vehicle to a moving vehicle, of vehicle exterior information with respect to the parked vehicle, which is acquired by a sensor device installed in the parked vehicle. For this purpose, the server 2 stores, for each of the vehicles 3-1 to 3-$n$, identification information on the vehicle (for example, a vehicle license-plate number), identification information on the terminal installed in the vehicle (for example, information that may be used for identifying the terminal in communicating with the terminal, such as a MAC address), identification information on a user of the vehicle, point information representing a balance of points that indicates an economic value owned by the user, and the like. In addition, the server 2 stores, for each of the vehicles 3-1 to 3-$n$, a type and a number of sensor devices that are installed on the vehicle and that may be used to acquire vehicle exterior information on an object around the vehicle, a sharing flag that represents whether the user of the vehicle permits sharing of the vehicle exterior information acquired by the sensor devices (in other words, providing the vehicle exterior information to other vehicles). Sensor devices that may be used for detecting an object around the vehicle include, for example, a camera provided for capturing periphery of the vehicle, a radar sensor, a LIDAR sensor, and a clearance sonar. The vehicle exterior information includes, for example, an image of the periphery of the parked vehicle acquired by the camera installed in the parked vehicle or information indicating a distance or a direction from the parked vehicle to an object around the parked vehicle acquired by the radar sensor, the LIDAR sensor, or the clearance sonar installed in the parked vehicle. The server 2 may further store, for each of the vehicles 3-1 to 3-$n$, a current position of the vehicle.

When server 2 receives, from a terminal installed in a parked vehicle, which is a vehicle being parked, of the vehicles 3-1 to 3-$n$, a detection signal indicating detection of a moving vehicle that is going to park around the parked vehicle and identification information on the moving vehicle, the server 2 confirms, with reference to the sharing flag for a user of the parked vehicle, whether the user of the parked vehicle permits sharing of vehicle exterior information. When the user of the parked vehicle permits sharing of the vehicle exterior information, the server 2 then sends, to a terminal installed in the moving vehicle, a confirmation signal for confirming whether to obtain the vehicle exterior information with respect to the parked vehicle acquired by the parked vehicle. Subsequently, upon receiving, from the terminal installed in the moving vehicle, an acknowledgment signal indicating a request for acquiring the vehicle exterior information with respect to the parked vehicle, the server 2 receives the vehicle exterior information from the terminal installed in the parked vehicle, and transfers the received vehicle exterior information to the terminal installed in the moving vehicle. The server 2 then subtracts points corresponding to a total amount of an amount of a price for the vehicle exterior information provided by the parked vehicle and an amount for a service charge from points represented by point information of a user of the moving vehicle, and adds, to points represented by point information of the user of the parked vehicle, points corresponding to an amount of the price for the vehicle exterior information provided by the parked vehicle.

Any one of the vehicles 3-1 to 3-$n$ can be the moving vehicle in the vehicle exterior information sharing process according to the present example embodiment. Of the vehicles 3-1 to 3-$n$, a vehicle including one or more sensor devices for acquiring vehicle exterior information with respect to the vehicle can be the parked vehicle in the vehicle exterior information sharing process according to the present example embodiment.

Each of the terminals 4-1 to 4-$n$ is, for example, a communication terminal or an in-vehicle navigation system, and is a device with a wireless communication function and capable of communicating, via an in-vehicle network provided in the vehicle, with a sensor device for acquiring vehicle exterior information or an Electronic Control Unit (ECU). The terminals 4-1 to 4-$n$ may be the same type of devices; alternatively, the terminals 4-1 to 4-$n$ may include devices of different types from each other. For example, the terminal 4-1 may be a navigation system installed in the vehicle 3-1 and the terminal 4-2 may be a communication terminal provided separately from the navigation system. Each of the terminals 4-1 to 4-*n* accesses a wireless base station 6 connected to the communication network 5 for example, via a gateway (not illustrated) to connect to the communication network 5 via the wireless base station 6.

Any one of the terminals 4-1 to 4-*n* is an example of the first terminal that sends vehicle exterior information and an example of the second terminal that receives the vehicle exterior information and presents the information to the driver. In other words, of the terminals 4-1 to 4-*n*, the terminal installed in the parked vehicle is an example of the first terminal while the terminal installed in the moving vehicle is an example of the second terminal. Each of the terminals 4-1 to 4-*n* sends, via the communication network 5 to the server 2, a detection signal, an acknowledgment signal, vehicle exterior information with respect to the vehicle in which the terminal is installed, or the like, or receives, from the server 2, a confirmation signal, a request signal, vehicle exterior information provided by the parked vehicle, or the like.

Furthermore, when each of the terminals 4-1 to 4-*n* is a device, such as an in-vehicle navigation system, which includes a user interface such as a display, each of the terminals 4-1 to 4-*n* may present the received vehicle exterior information with respect to the parked vehicle to the driver by displaying the vehicle exterior information. Alternatively, each of the terminals 4-1 to 4-*n* may present the received vehicle exterior information with respect to the parked vehicle to the driver by causing a device connected to the terminal via the in-vehicle network and including a user interface to display the vehicle exterior information.

Figure 2:
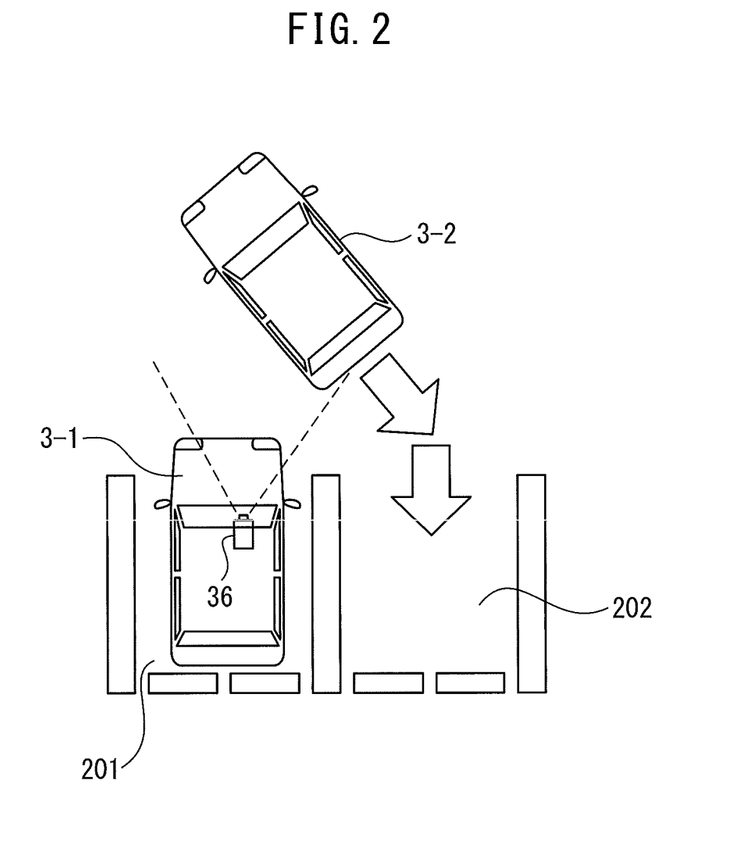
FIG. 2 is a diagram illustrating an example of a situation in which a vehicle exterior information sharing process is executed.

FIG. 2 is a diagram illustrating an example of a situation in which the vehicle exterior information sharing process according to the present example embodiment is executed. In this example, the vehicle 3-1 has been parked in a parking space 201, and the vehicle 3-2 is going to park in a parking space 202 adjacent to the parking space 201. In other words, in the vehicle exterior information sharing process according to the present example embodiment, the vehicle 3-1 is the parked vehicle and the vehicle 3-2 is the moving vehicle. The user of the moving vehicle is the driver of the moving vehicle. Vehicle exterior information on an object around the vehicle 3-1 acquired by a sensor device 36 installed in the vehicle 3-1 is transmitted to the vehicle 3-2.

Figure 3:
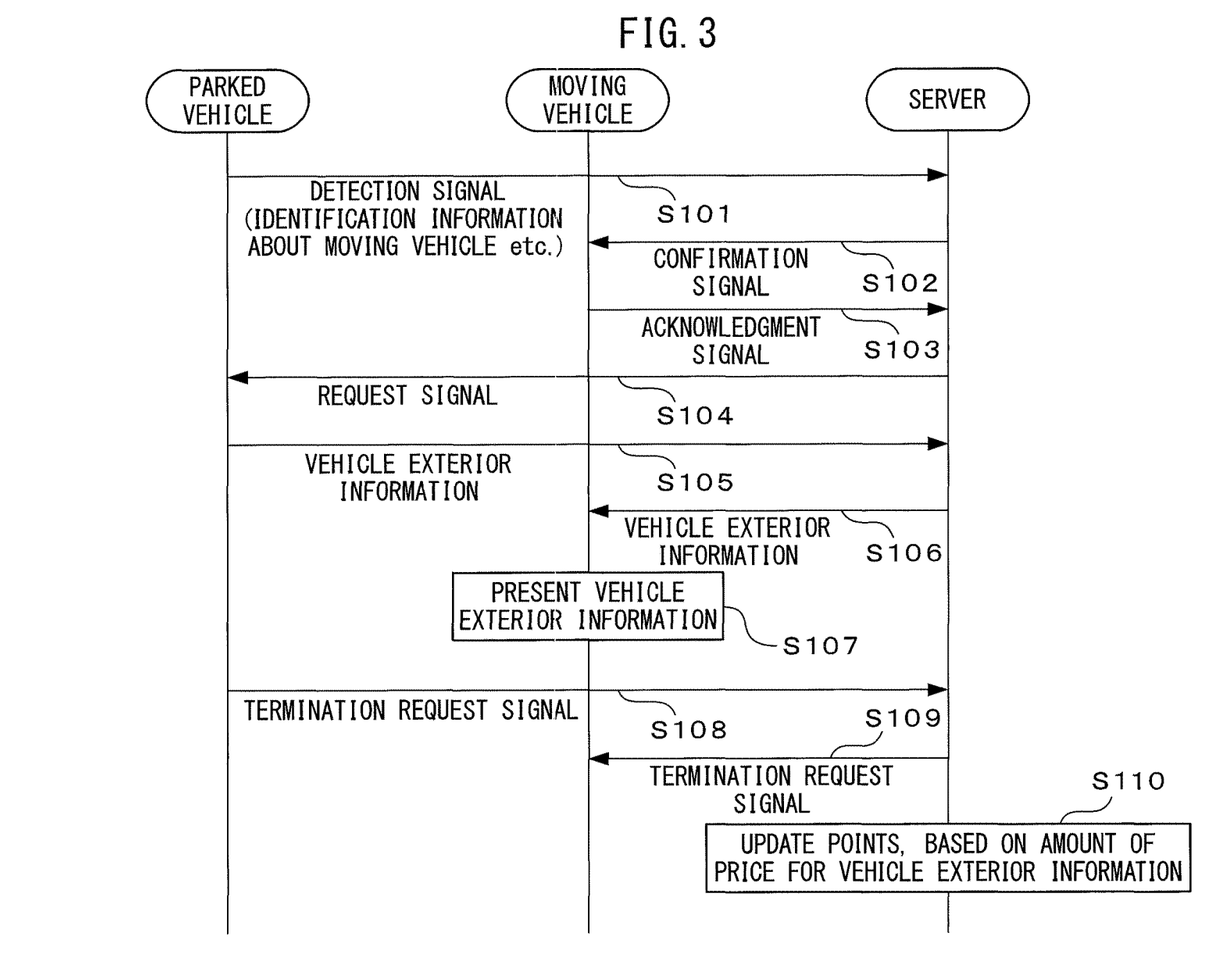
FIG. 3 is a sequence diagram with respect to the vehicle exterior information sharing process.

FIG. 3 is a sequence diagram with respect to the vehicle exterior information sharing process according to the present example embodiment. FIG. 3 illustrates a flow of the vehicle exterior information sharing process in the situation illustrated in FIG. 2 when vehicle exterior information on the object around the vehicle 3-1 acquired by the sensor device 36 installed in the vehicle 3-1 is sent from the vehicle 3-1 (parked vehicle) to the vehicle 3-2 (moving vehicle), and the vehicle exterior information is shared between the vehicle 3-1 and the vehicle 3-2. In the sequence diagram illustrated in FIG. 3, communication between the terminal installed in each vehicle and the server 2 is performed, as described above, via the communication network 5. In the sequence diagram, the vehicle 3-1 is referred to as the parked vehicle while the vehicle 3-2 is referred to as the moving vehicle.

First, when a parked vehicle detects a moving vehicle that is going to park in an adjacent parking space, the terminal 4-1 installed in the parked vehicle sends, to the server 2, a detection signal indicating detection of the moving vehicle and including identification information on the moving vehicle and identification information on the parked vehicle (step S101). The detection signal may include identification information on the terminal installed in the parked vehicle together with or instead of the identification information on the parked vehicle.

Detection of the moving vehicle is executed, for example, by the terminal 4-1 or an ECU installed in the parked vehicle. In the following description, it is assumed that the terminal 4-1 detects the moving vehicle. For example, when the terminal 4-1 detects, on the basis of a sensor signal acquired by a radar sensor, a LIDAR sensor, or a clearance sonar installed in the parked vehicle, an object that exists within a certain range around a predetermined direction (for example, a range of ±60° around a front direction of the parked vehicle) and within a certain distance from the parked vehicle for a certain period of time (for example, on several seconds to ten seconds) or more, the terminal 4-1 determines the object to be a moving vehicle. The terminal 4-1 then starts a camera installed in the parked vehicle, and detects an area in which a license plate of the moving vehicle appears in an image obtained by capturing a region in the predetermined direction by the camera. To detect the area in which the license plate of the moving vehicle appears, the terminal 4-1 uses, for example, a classifier that has performed learning in advance for detecting a license plate from an image. As such a classifier, for example, a support vector machine, AdaBoost, or a multilayer perceptron is employed. The terminal 4-1 extracts a feature such as HOG to be input to the classifier from a window set in an image and inputs the extracted feature to the classifier to determine whether the license plate appears in the window. The terminal 4-1 can detect the area in the image in which the license plate appears by repeating the process as described above with changing a position of the window in the image.

The terminal 4-1 detects, by executing a character recognition process on the detected area in which the license plate appears, the vehicle license-plate number of the moving vehicle as identification information on the moving vehicle. The terminal 4-1 may apply a character recognition process by means of, for example, template matching or other character recognition techniques as the character recognition process.

Upon receiving the detection signal from the terminal 4-1 installed in the parked vehicle, the server 2 refers to a sharing flag for a user of the parked vehicle, which is associated with the identification information on the parked vehicle included in the detection signal, to determine whether the user of the parked vehicle permits sharing of the vehicle exterior information with respect to the parked vehicle, which is acquired by the sensor device installed in the parked vehicle. When the user permits sharing of the vehicle exterior information, the server 2 refers to the identification information on the terminal, which is associated with the identification information on the moving vehicle included in the detection signal, to identify a terminal installed in the moving vehicle, and sends, to the identified terminal, a confirmation signal for confirming whether to obtain the vehicle exterior information with respect to the parked vehicle (step S102). The server 2 may identify a vehicle license-plate number of the parked vehicle corresponding to the identification information on the parked vehicle included in the detection signal, and include the identified vehicle license-plate number of the parked vehicle in the confirmation signal. With this operation, the driver of the moving vehicle may confirm from which vehicle around the moving vehicle the driver can obtain vehicle exterior information.

Upon receiving the confirmation signal, the terminal installed in the moving vehicle inquires, through a user interface that the terminal includes or a user interface that a device connected to the terminal includes, whether the driver requests to acquire the vehicle exterior information with respect to the parked vehicle. When the driver of the moving vehicle performs, through the user interface that the terminal installed in the moving vehicle includes or the user interface that the device connected to the terminal includes, an operation indicating a request for acquiring the vehicle exterior information with respect to the parked vehicle, the terminal sends, to the server 2, an acknowledgment signal indicating a request for acquiring the vehicle exterior information (step S103). When the driver of the moving vehicle performs an operation indicating that the driver does not request to acquire the vehicle exterior information, the terminal may send a rejection signal indicating that the driver does not request to acquire the vehicle exterior information to the server 2.

Upon receiving the acknowledgment signal, the server 2 sends, to the terminal installed in the parked vehicle, a request signal for requesting transmission of the vehicle exterior information (step S104). Upon receiving the request signal, the terminal installed in the parked vehicle acquires the vehicle exterior information with the sensor device installed in the parked vehicle at a certain interval (for example, one to three seconds), and sends the acquired vehicle exterior information to the server 2 (step S105). Every time the server 2 receives the vehicle exterior information from the terminal installed in the parked vehicle, the server 2 transfers the vehicle exterior information to the terminal installed in the moving vehicle (step S106). The terminal installed in the moving vehicle then presents the received vehicle exterior information to the driver of the moving vehicle (step S107).

When there are a plurality of sensor devices installed in the parked vehicle, the terminal installed in the parked vehicle may send vehicle exterior information acquired by each of the sensor devices to the server 2; alternatively, the terminal installed in the parked vehicle may send vehicle exterior information acquired by any one of the sensor devices to server 2. For example, when the parked vehicle includes a camera and a radar sensor as sensor devices, the terminal installed in the parked vehicle may send both of the image acquired by the camera and a distance and a direction to the object around the vehicle, which are obtained from the detection signal acquired by the radar sensor, as the vehicle exterior information to the server 2; alternatively, the terminal installed in the parked vehicle may send only the image acquired by the camera.

Subsequently, when the driver of the moving vehicle performs, through the user interface that the terminal installed in the moving vehicle includes or the user interface that the device connected to the terminal includes, an operation for stopping acquisition of the vehicle exterior information, or when the moving vehicle shifts into park, the terminal installed in the moving vehicle sends, to the server 2, a termination request signal indicating a request for stopping acquisition of the vehicle exterior information (step S108). Upon receiving the termination request signal, the server 2 transfers the termination request signal to the terminal installed in parked vehicle (step S109). Upon receiving the termination request signal, the terminal installed in the parked vehicle stops sending the vehicle exterior information.

Upon receiving the termination request signal, the server 2 subtracts points corresponding to a total amount of an amount of a price for the vehicle exterior information provided by the parked vehicle and an amount for a service charge from points represented by point information of the user of the moving vehicle, and adds, to points represented by point information of the user of the parked vehicle, points corresponding to an amount of the price for the vehicle exterior information provided by the parked vehicle (step S110). The server 2 may notify the terminal installed in the parked vehicle of the points after addition. In a similar fashion, the server 2 may notify the terminal installed in the moving vehicle of the points after subtraction. Alternatively, when the server 2 stores a contact address of the user of the parked vehicle (for example, an email address or a telephone number), the server 2 may send, to the address, a message for informing the points after addition. In a similar fashion, when the server 2 stores a contact address of the user of the moving vehicle, the server 2 may send, to the address, a message for informing the points after subtraction. Then, the vehicle exterior information sharing system ends the vehicle exterior information sharing process.

Details of the server 2 will be described below.

Figure 4:
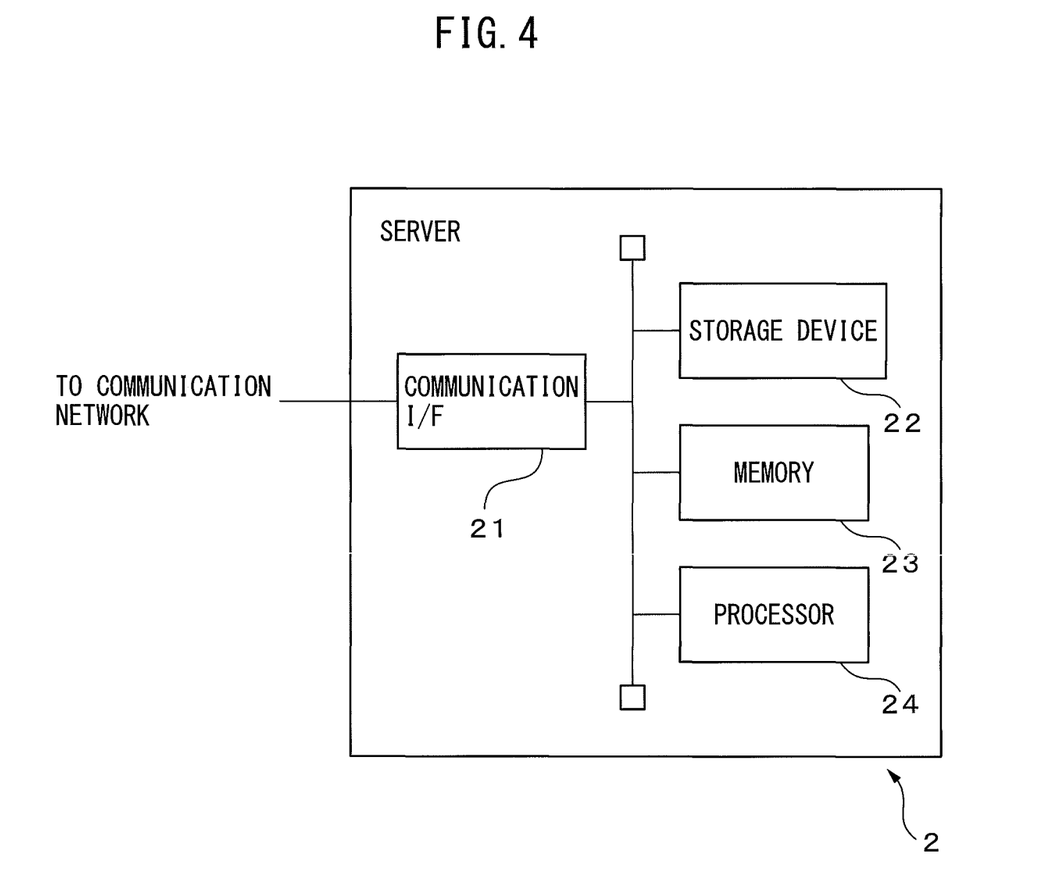
FIG. 4 is a schematic configuration diagram of a server that is an example of a vehicle exterior information sharing apparatus.

FIG. 4 is a schematic configuration diagram of the server 2. The server 2 includes a communication interface 21, a storage device 22, a memory 23, and a processor 24. The communication interface 21, the storage device 22, and the memory 23 are connected to the processor 24 via a signal line. The server 2 may further include an input device such as a keyboard or a mouse and an output device such as a display.

The communication interface 21 is an example of the communication unit, and includes an interface circuit for connecting the server 2 to the communication network 5. The communication interface 21 is configured to be capable of communicating with each of the terminals 4-1 to 4-$n$. In other words, the communication interface 21 passes the detection signal, the acknowledgment signal, the termination request signal, the vehicle exterior information, or the like received from any one of the terminals 4-1 to 4-$n$ via the communication network 5 to the processor 24. The communication interface 21 outputs the confirmation signal, the request signal, termination request signal, the vehicle exterior information, or the like received from the processor 24 to the communication network 5.

The storage device 22 is an example of a storage unit, and includes, for example, a hard disk device or an optical recording medium and an access device therefor. The storage device 22 stores, for each of the vehicles 3-1 to 3-$n$, identification information on the vehicle and identification information on the terminal installed in the vehicle in association with each other. The storage device 22 also stores, for each of the vehicles 3-1 to 3-$n$, the sharing flag, identification information on the user such as a name and a user number of the user of the vehicle, point information, and the like. In addition, the storage device 22 may store, for each of the vehicles 3-1 to 3-$n$, a type and a number of sensor devices that may be used for detecting an object around the vehicle. Furthermore, the storage device 22 may also store a computer program for executing the vehicle exterior information sharing process.

The memory 23 is another example of the storage unit, and includes, for example, non-volatile semiconductor memory and volatile semiconductor memory. The memory 23 stores various types of data generated during execution of the vehicle exterior information sharing process, the vehicle exterior information received from the terminal installed in the parked vehicle, and the like.

The processor 24 is an example of the control unit, and includes one or more CPUs (Central Processing Unit) and a peripheral circuit thereof. The processor 24 may further include another arithmetic circuit such as an arithmetic logic unit or a numeric data processing unit. The processor 24 executes processing of a portion associated with the server 2 of the vehicle exterior information sharing process.

Figure 5:
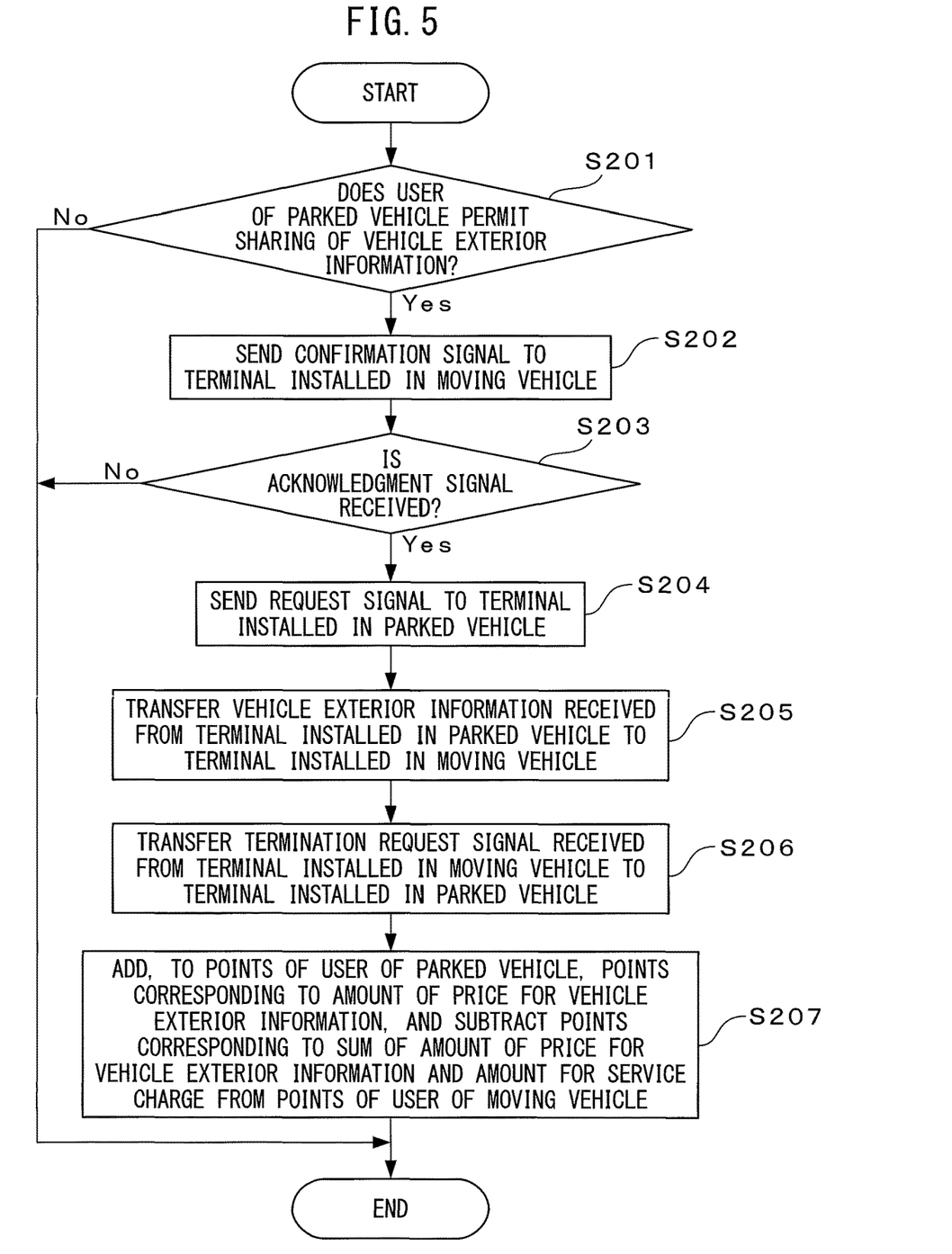
FIG. 5 is an operation flowchart of processing of a portion associated with the server of the vehicle exterior information sharing process.

FIG. 5 is an operation flowchart of processing of the portion associated with the server 2 of the vehicle exterior information sharing process. When the server 2 receives the detection signal from the terminal installed in the parked vehicle in the parked vehicle via the communication network 5 and the communication interface 21, the processor 24 executes processing of the portion associated with the server 2 of the vehicle exterior information sharing process in accordance with the operation flowchart illustrated in FIG. 5.

The processor 24 refers to the sharing flag with respect to the parked vehicle, which is associated with the identification information on the parked vehicle included in the detection signal, to determine whether the user of the parked vehicle permits sharing of the vehicle exterior information with respect to the parked vehicle, which is acquired by the sensor device installed in the parked vehicle (step S201). When the user does not permit sharing of the vehicle exterior information (step S201-No), the processor 24 ends the vehicle exterior information sharing process.

On the other hand, when the user of the parked vehicle permits sharing of the vehicle exterior information (step S201—Yes), the processor 24 refers to the identification information on the terminal, which is associated with the identification information on the moving vehicle included in the detection signal, to identify the terminal installed in the moving vehicle. The processor 24 then generates a confirmation signal for confirming whether to acquire the vehicle exterior information with respect to the parked vehicle, and sends the generated confirmation signal via the communication interface 21 and the communication network 5 to the identified terminal (step S202).

The processor 24 determines whether the processor 24 has received an acknowledgment signal indicating a request for acquisition of the vehicle exterior information from the terminal installed in the moving vehicle within a certain period of time (for example, one minute) after sending the confirmation signal (step S203). When the processor 24 has not received an acknowledgment signal within a certain period of time, or when the processor 24 has received from the terminal installed in the moving vehicle, via the communication interface 21 and the communication network 5, a rejection signal indicating that acquisition of the vehicle exterior information is not requested within the certain period of time (step S203—No), the processor 24 ends the vehicle exterior information sharing process.

On the other hand, when the processor 24 has received from the terminal installed in the moving vehicle, via the communication interface 21 and the communication network 5, an acknowledgment signal within the certain period of time (step S203—Yes), the processor 24 generates a request signal for requesting transmission of the vehicle exterior information, and sends the generated request signal to the terminal installed in the parked vehicle via the communication interface 21 and the communication network 5 (step S204). Then, every time the processor 24 receives from the terminal installed in the parked vehicle, via the communication interface 21 and the communication network 5, the vehicle exterior information, the processor 24 transfers the received vehicle exterior information to the terminal installed in the moving vehicle via the communication interface 21 and the communication network 5 (step S205).

Subsequently, when the processor 24 receives from the terminal installed in the moving vehicle, via the communication interface 21 and the communication network 5, the termination request signal, the processor 24 transfers the received termination request signal to the terminal installed in the parked vehicle via the communication interface 21 and the communication network 5 (step S206). The processor 24 also reads out the points of the user of the moving vehicle from the storage device 22, updates the points of the user of the moving vehicle by subtracting the points corresponding to the total amount of the amount of the price for the vehicle exterior information provided by the parked vehicle and the amount for the service charge from the points that have been read out, and stores the updated points in the storage device 22. Furthermore, the processor 24 reads out the points of the user of the parked vehicle from the storage device 22, updates the points of the user of the parked vehicle by adding, to the points that have been read out, the points corresponding to the amount of the price for the vehicle exterior information provided by the parked vehicle, and stores the updated points in the storage device 22 (step S207). Then, the processor 24 ends the vehicle exterior information sharing process.

According to a variation, the processor 24 may refer, between the step S201 and the step S202, to the identification information on the parked vehicle and the identification information on the moving vehicle, which are included in the detection signal, and read out, from the storage device 22, the number of the sensor devices that the parked vehicle includes, which may be used for acquiring vehicle exterior information, and the number of the sensor devices that the moving vehicle includes, which may be used for acquiring vehicle exterior information. The processor 24 may compare the number of the sensor devices that the parked vehicle includes, which may be used for acquiring vehicle exterior information, with the number of the sensor devices that the moving vehicle includes, which may be used for acquiring vehicle exterior information. The processor 24 may execute processing in the step S202 or later only when the number of the sensor devices that the parked vehicle includes, which may be used for acquiring vehicle exterior information, is more than the number of the sensor devices that the moving vehicle includes, which may be used for acquiring vehicle exterior information.

Alternatively, the processor 24 may refer, between the step S201 and the step S202, to the identification information on the moving vehicle included in the detection signal and read out, from the storage device 22, the type of the sensor devices that the moving vehicle includes, which may be used for acquiring vehicle exterior information. The processor 24 may determine whether the moving vehicle includes a sensor device that may be used for acquiring vehicle exterior information with respect to a rear side of the moving vehicle. The processor 24 may execute processing in the step S202 or later only when the moving vehicle does not include a sensor device that may be used for acquiring the vehicle exterior information with respect to the rear side of the moving vehicle.

With this operation, when the moving vehicle can acquire vehicle exterior information on an object around the moving vehicle on its own, the driver of the moving vehicle does not receive inquiry on whether to obtain vehicle exterior information with respect to the parked vehicle; thus, complexity that the driver of the moving vehicle suffers will be reduced.

According to another variation, when the storage device 22 stores a contact address of the user of the moving vehicle, the processor 24 may send, via the communication interface 21 and the communication network 5, a confirmation signal to the address. In this case, the server 2 may receive, from the address to which the confirmation signal has been sent, an acknowledgment signal or a rejection signal.

Next, details of the terminals 4-1 to 4-n will be described. With respect to a configuration associated with the vehicle exterior information sharing process, each terminal may have the same configuration; therefore, only the configuration of the terminal 4-1 will be described below.

Figure 6:
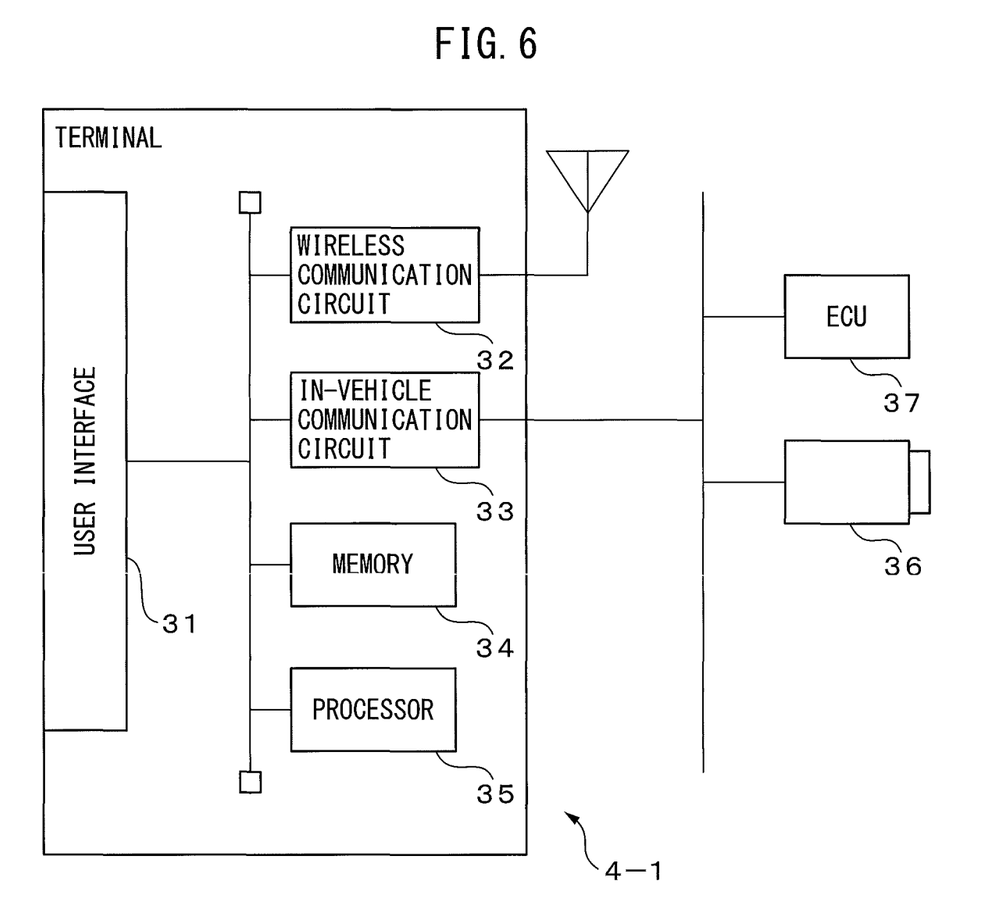
FIG. 6 is a schematic configuration diagram of a terminal.

FIG. 6 is a schematic configuration diagram of the terminal 4-1. The terminal 4-1 includes a user interface 31, a wireless communication circuit 32, an in-vehicle communication circuit 33, a memory 34, and a processor 35. The terminal 4-1 may further include a position-measuring circuit (not illustrated) for receiving a GPS signal and measuring a position of the device itself on the basis of the received GPS signal. When a device connected to the terminal 4-1 via the in-vehicle network includes a user interface, the user interface 31 may be omitted.

The user interface 31 includes, for example, a touchscreen display. The user interface 31 generates a signal according to an operation by a user associated with the vehicle exterior information sharing process (for example, starting of an application associated with the vehicle exterior information sharing process, input of presence or absence of an intention to obtain vehicle exterior information in response to a confirmation signal, termination of acquisition of the vehicle exterior information), and outputs the signal to the processor 35. The user interface 31 also displays various types of information for display received from the processor 35 (for example, a message for inquiring presence or absence of an intention to obtain vehicle exterior information when receiving a confirmation signal, the received vehicle exterior information, or the like).

The wireless communication circuit 32 includes, for example, an antenna and a signal processing circuit for executing various types of processes associated with wireless communication such as modulation and demodulation of a radio signal. The wireless communication circuit 32 receives a downlink radio signal from the wireless base station 6 connected to the communication network 5 via a gateway or the like, and sends an uplink radio signal to the wireless base station 6. In other words, the wireless communication circuit 32 retrieves, from the downlink radio signal received from the wireless base station 6, a signal transmitted from the server 2 to the terminal 4-1 (for example, a confirmation signal, a request signal, a termination request signal, vehicle exterior information from another vehicle, or the like), and passes the signal to the processor 35. The wireless communication circuit 32 also generates an uplink radio signal including a signal received from the processor 35 and sent to the server 2 (for example, an acknowledgment signal, a termination request signal, vehicle exterior information with respect to the vehicle, or the like), and sends the radio signal.

The in-vehicle communication circuit 33 includes an interface circuit for connecting the terminal 4-1 to an in-vehicle network that is provided in the vehicle 3-1 and that complies with a predetermined communication standard such as the Controller Area Network. The in-vehicle communication circuit 33 receives, from the sensor device 36 included in the vehicle 3-1 or an ECU 37, the vehicle exterior information acquired by the sensor device 36 via the in-vehicle network, and passes the received vehicle exterior information to the processor 35. Alternatively, the in-vehicle communication circuit 33 outputs a control signal that gives instruction to start or stop acquisition of the vehicle exterior information received from the processor 35 to the sensor device 36 or the ECU 37 via the in-vehicle network.

The memory 34 includes, for example, non-volatile readable/writable semiconductor memory and volatile readable/writable semiconductor memory. The memory 34 stores various types of application programs to be executed by the processor 35 and various types of data. The memory 34 stores various types of data associated with execution of the vehicle exterior information sharing process.

The processor 35 includes one or more CPUs and a peripheral circuit thereof. The processor 35 may further include another arithmetic circuit such as an arithmetic logic unit or a numeric data processing unit. The processor 35 executes processing of a portion associated with the terminal installed in the moving vehicle or a portion associated with the terminal installed in the parked vehicle of the vehicle exterior information sharing process. For example, the processor 35 executes the aforementioned process of detecting a moving vehicle to generate a detection signal, and outputs the generated detection signal to the wireless communication circuit 32. Alternatively, the processor 35 generates, in response to an operation by the user, a signal to be sent to the server 2 (an acknowledgment signal, a termination request signal, or the like). When the processor 35 is receiving the vehicle exterior information provided by the parked vehicle, the processor 35 may generate, upon notification from the ECU that the moving vehicle has shifted into park, a termination request signal. The processor 35 then outputs the generated signal to the wireless communication circuit 32. Upon receiving the request signal sent by the server 2 via the wireless communication circuit 32, the processor 35 also generates a control signal that gives instruction to start acquisition of the vehicle exterior information to the sensor device 36, and outputs the control signal to the sensor device 36 or the ECU 37 via the in-vehicle communication circuit 33. In a similar fashion, upon receiving the termination request signal sent by the server 2 via the wireless communication circuit 32, the processor 35 generates a control signal that gives instruction to stop acquisition of the vehicle exterior information to the sensor device 36, and outputs the control signal to the sensor device 36 or the ECU 37 via the in-vehicle communication circuit 33. Furthermore, the processor 35 causes the user interface 31 to display the vehicle exterior information with respect to the parked vehicle, which is received via the wireless communication circuit 32.

When the terminal 4-1 does not include the user interface 31 and the device connected to the terminal 4-1 via the in-vehicle network includes a user interface, the processor 35 may send the received vehicle exterior information to the device with the user interface via the in-vehicle communication circuit 33 and the in-vehicle network to cause the device to display the vehicle exterior information.

When the received vehicle exterior information is an image acquired by the camera installed in the parked vehicle, to help the driver of the moving vehicle understand the situation around the parked vehicle that appears in the image, the processor 35 may perform a view transformation process on the image to convert the image into a top-down view image. In this case, information on the camera installed in the parked vehicle preferably used for the view transformation process such as an angle of view, a direction of image capturing, and a height above the ground of the camera may be included in the vehicle exterior information transmitted from the parked vehicle to the moving vehicle.

As described above, the vehicle exterior information sharing system, the vehicle exterior information sharing apparatus, and the vehicle exterior information sharing method can provide a vehicle that is going to park with vehicle exterior information acquired with respect to another vehicle already parked around the vehicle. Therefore, even if the vehicle that is going to park is not equipped with a sensor device for acquiring information on an object around the vehicle, a driver of the vehicle that is going to park can utilize the vehicle exterior information; thus, a possibility of collision with the another vehicle during parking will be reduced.

According to a variation, the terminals 4-1 to 4-*n* may be configured to be capable of making a so-called inter-vehicle communication, in other words, capable of wirelessly communicating with each other in peer-to-peer fashion. For example, the wireless communication circuit 32 may be configured to be capable of sending or receiving a radio signal in compliance with a predetermined wireless communication standard for inter-vehicle communication.

In this case, when communication is established between the terminal installed in the moving vehicle and the terminal installed in the parked vehicle, the terminal installed in the parked vehicle may determine that the terminal has detected the moving vehicle. Then, either one of the terminals installed in the moving vehicle or the parked vehicle may send a detection signal to the server 2 via the wireless base station 6 and the communication network 5. For example, when the terminal installed in the moving vehicle is notified by the ECU of the moving vehicle via the in-vehicle network that the moving vehicle has shifted into reverse, the terminal may start a procedure for establishing communication in accordance with the predetermined communication standard to establish communication with the terminal installed in the parked vehicle already parked around the moving vehicle. In this case, processing for sending a confirmation signal in the step S102 of the sequence diagram illustrated in FIG. 3 may be omitted. This is because, in this variation, it is considered that the driver of the moving vehicle wishes to obtain vehicle exterior information with respect to the parked vehicle since the moving vehicle is searching for a parked vehicle that may be capable of providing vehicle exterior information.

In addition, in this variation, the vehicle exterior information with respect to the parked vehicle may be directly sent, without involving the server 2, from the terminal installed in the parked vehicle to the terminal installed in the moving vehicle. In a similar fashion, the termination request signal may be directly sent from the terminal installed in the moving vehicle to the terminal installed in the parked vehicle. In this case, either one of the terminal installed in the moving vehicle and the terminal installed in the parked vehicle may notify the server 2, via the wireless base station 6 and the communication network 5, that the vehicle exterior information with respect to the parked vehicle has been provided to the moving vehicle. Upon receiving the notification, the server 2 may execute processing for updating the point information in the step S110 of the sequence diagram illustrated in FIG. 3. For determination of whether to send the vehicle exterior information, the terminal installed in the parked vehicle may notify the terminal installed in the moving vehicle of the number of the sensor devices that the parked vehicle includes, which may be used for acquiring vehicle exterior information. The terminal installed in the moving vehicle may compare the number of the sensor devices that the parked vehicle includes, which may be used for acquiring vehicle exterior information, with the number of the sensor devices that the moving vehicle includes, which may be used for acquiring vehicle exterior information. In this case, the terminal installed in the moving vehicle may send a request signal to the terminal installed in the parked vehicle only when the number of the sensor devices that the parked vehicle includes, which may be used for acquiring vehicle exterior information, is more than the number of the sensor devices that the moving vehicle includes, which may be used for acquiring vehicle exterior information.

According to this variation, the vehicle exterior information is transmitted without involving the communication network 5; thus, communication load on the communication network 5 may be reduced.

According to another variation, when the server 2 can communicate with a garage management system (not illustrated) a parking space of which may be reserved via the communication network 5, the server 2 may receive, from the management system, identification information on a parked vehicle for each parking space. The server 2 may determine, when any one of the vehicles 3-1 to 3-*n* is parked in one of two parking spaces adjacent to each other, the vehicle parked in the space as the parked vehicle in the aforementioned process by referring to the received identification information, and upon notification by the management system that a vehicle for which reservation of the other of the two parking spaces has entered the garage, the server 2 may determine the vehicle as the moving vehicle in the aforementioned process and execute the vehicle exterior information sharing process.

According to still another variation, the server 2 may send the vehicle exterior information received from the terminal installed in the parked vehicle to the address of the user of the moving vehicle, which is stored in the server 2. In this case, a device that is the destination of the address of the user of the moving vehicle, for example, a mobile phone that the user of the moving vehicle owns (which means that it exists inside the moving vehicle) receives the vehicle exterior information, and a display included in the device displays the received vehicle exterior information; in this manner, the vehicle exterior information is presented to the user of the moving vehicle. In other words, the device being the destination of the address of the user of the moving vehicle is another example of the second terminal.

According to yet still another variation, the moving vehicle may be provided with the vehicle exterior information by a plurality of parked vehicles.

Figure 7:
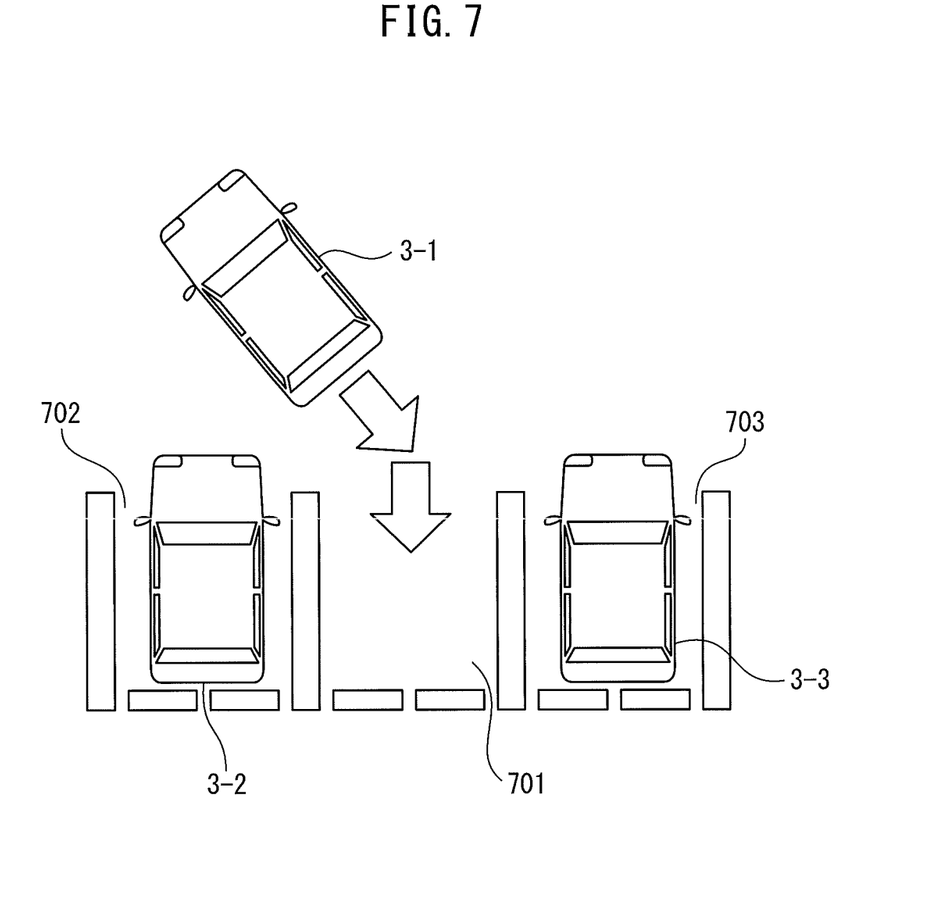
FIG. 7 is a diagram illustrating another example of a situation in which the vehicle exterior information sharing process is executed.

FIG. 7 is a diagram illustrating another example of a situation in which the vehicle exterior information sharing process is executed. In this example, a vehicle 3-1 is going to park in a parking space 701, and a vehicle 3-2 has been parked in a parking space 702 adjacent to the parking space 701. In addition, a vehicle 3-3 has been parked in a parking space 703, which is adjacent to the parking space 701 and which is positioned on the opposite side across the parking space 702. In this case, in the vehicle exterior information sharing process, the vehicle 3-1 is the moving vehicle and the vehicle 3-2 and the vehicle 3-3 are the parked vehicles. The server 2 may execute the vehicle exterior information sharing process in cooperation with a terminal 4-1 installed in the vehicle 3-1 and a terminal 4-2 installed in the vehicle 3-2 and execute the vehicle exterior information sharing process in cooperation with the terminal 4-1 and a terminal 4-3 installed in the vehicle 3-3.

According to this variation, a driver of the moving vehicle can utilize the vehicle exterior information from the plurality of parked vehicles that are individually parked at different positions relative to the moving vehicle; thus, the driver can park the moving vehicle more safely.

According to yet still another variation, a server for managing points of a user of each vehicle (for distinction from the server 2, hereinafter referred to as a point management server) may be provided separately from the server 2. The point management server may be capable of communicating with the server 2 via the communication network 5. In this case, in processing of a portion associated with the vehicle exterior information sharing process illustrated in FIG. 5, processing for the step S207 may be omitted. Instead, the processor 24 of the server 2 may generate a signal for informing points to be added to the points of the user of the parked vehicle that provided the vehicle exterior information and points to be subtracted from the points of the user of the moving vehicle, and send the signal to the point management server via the communication interface 21 and the communication network 5.

The computer program that causes a computer to execute the aforementioned process to be executed by the processor 24 of the server 2 may be recorded and distributed on a recording medium, for example, an optical recording medium or a magnetic recording medium.

As described above, those skilled in the art may make various modifications according to embodiments within the scope of the present invention.

What is claimed is:

1. A vehicle exterior information sharing system comprising:
   a first terminal in a first vehicle that is a parked vehicle; and
   a second terminal in a second vehicle that is a moving vehicle,
      wherein, when it is detected that the second vehicle is going to park around the first vehicle while the first vehicle is parked, the first terminal sends vehicle exterior information on an object around the first vehicle, which is acquired by a sensor device installed on the first vehicle, and
      wherein the second terminal receives the vehicle exterior information sent by the first terminal and presents the received vehicle exterior information to a driver of the second vehicle.

2. The vehicle exterior information sharing system according to claim 1, further comprising a vehicle exterior information sharing apparatus that transfers the vehicle exterior information sent by the first terminal to the second terminal.

3. The vehicle exterior information sharing system according to claim 2, wherein the vehicle exterior information sharing apparatus comprises:
   a communication circuit capable of communicating with the first terminal and the second terminal;
   a memory that stores a number of sensor devices that are installed on the first vehicle and that may be used for acquiring the vehicle exterior information on an object around the first vehicle and a number of sensor devices that are installed on the second vehicle and that may be used for acquiring vehicle exterior information on an object around the second vehicle; and
   a processor configured to transfer the received vehicle exterior information to the second terminal via the communication circuit only when the number of the sensor devices installed on the first vehicle is more than the number of the sensor devices installed on the second vehicle.

4. The vehicle exterior information sharing system according to claim 1, wherein the first terminal and the second terminal can communicate with each other and, when communication is established between the first terminal and the second terminal while the first vehicle is parked, the first terminal detects that the second vehicle is going to park around the first vehicle.

5. A vehicle exterior information sharing apparatus, comprising:
   a communication circuit capable of communicating with a first terminal in a first vehicle and a second terminal in a second vehicle; and
   a processor configured to receive, when it is detected that the second vehicle is going to park around the first vehicle while the first vehicle is parked, vehicle exterior information on an object around the first vehicle, which is acquired by a sensor device installed on the first vehicle from the first terminal via the communication circuit and transfer the received vehicle exterior information to the second terminal via the communication circuit.

6. The vehicle exterior information sharing apparatus according to claim 5, further comprising:
   a memory that stores a number of sensor devices that are installed on the first vehicle and that may be used for acquiring the vehicle exterior information on an object around the first vehicle and a number of sensor devices that are installed on the second vehicle and that may be used for acquiring vehicle exterior information on an object around the second vehicle,
   wherein the processor transfers the received vehicle exterior information to the second terminal via the communication circuit only when the number of the sensor devices installed on the first vehicle is more than the number of the sensor devices installed on the second vehicle.

7. A vehicle exterior information sharing method in a vehicle exterior information sharing system including a first terminal in a first vehicle and a second terminal in a second vehicle, comprising:
   sending by the first terminal, when it is detected that the second vehicle is going to park around the first vehicle while the first vehicle is parked, vehicle exterior information on an object around the first vehicle, which is acquired by a sensor device installed on the first vehicle, and
   receiving, by the second terminal, the vehicle exterior information sent by the first terminal and presenting, by the second terminal, the received vehicle exterior information to a driver of the second vehicle.

8. The vehicle exterior information sharing system according to claim 2, wherein the first terminal and the second terminal can communicate with each other and, when communication is established between the first terminal and the second terminal while the first vehicle is parked, the first terminal detects that the second vehicle is going to park around the first vehicle.

9. The vehicle exterior information sharing system according to claim 3, wherein the first terminal and the second terminal can communicate with each other and, when communication is established between the first terminal and the second terminal while the first vehicle is parked, the first terminal detects that the second vehicle is going to park around the first vehicle.

* * * * *